Figure 1:
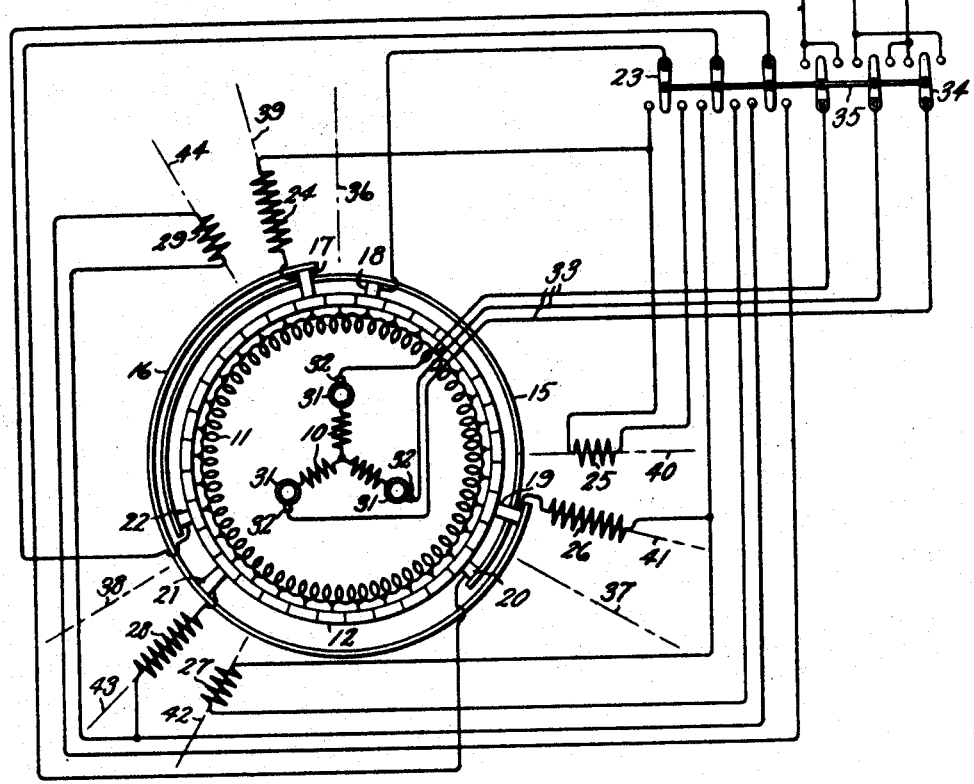

Sept. 27, 1932.  A. F. HEINRICH  1,879,229
POWER FACTOR REGULATION OF ALTERNATING CURRENT MACHINES
Filed Dec. 28, 1931  2 Sheets-Sheet 1

Inventor:
Arthur F. Heinrich,
by Charles E. Mulla
His Attorney.

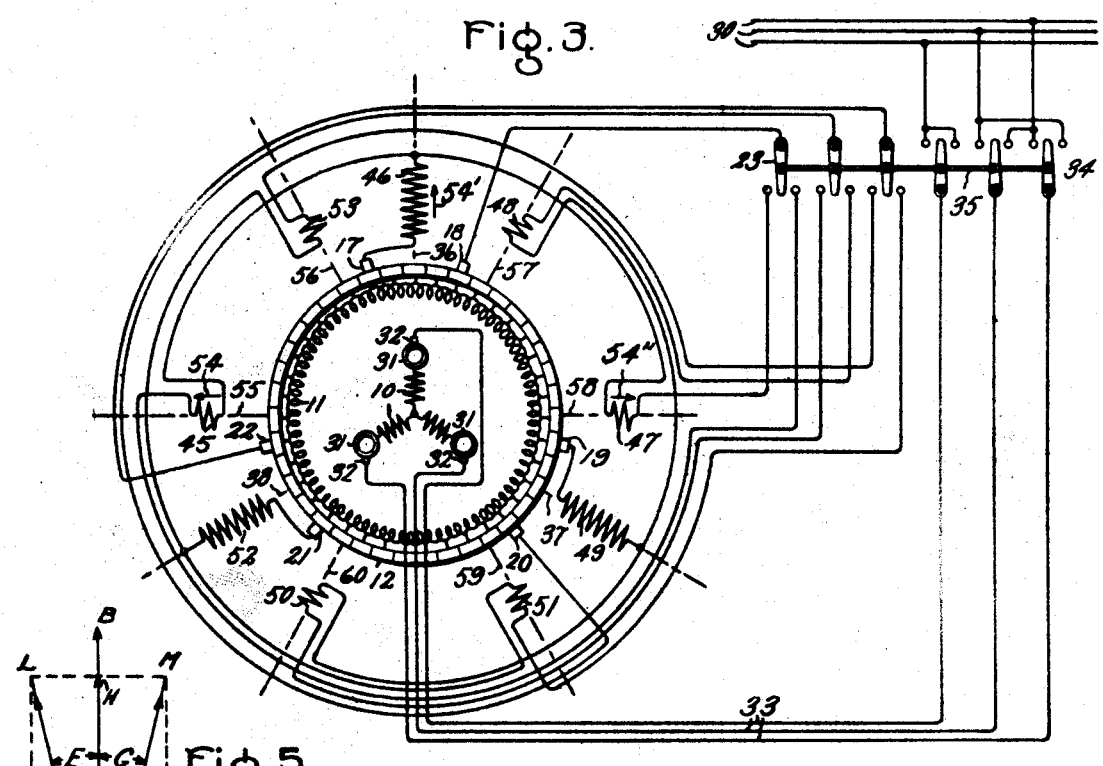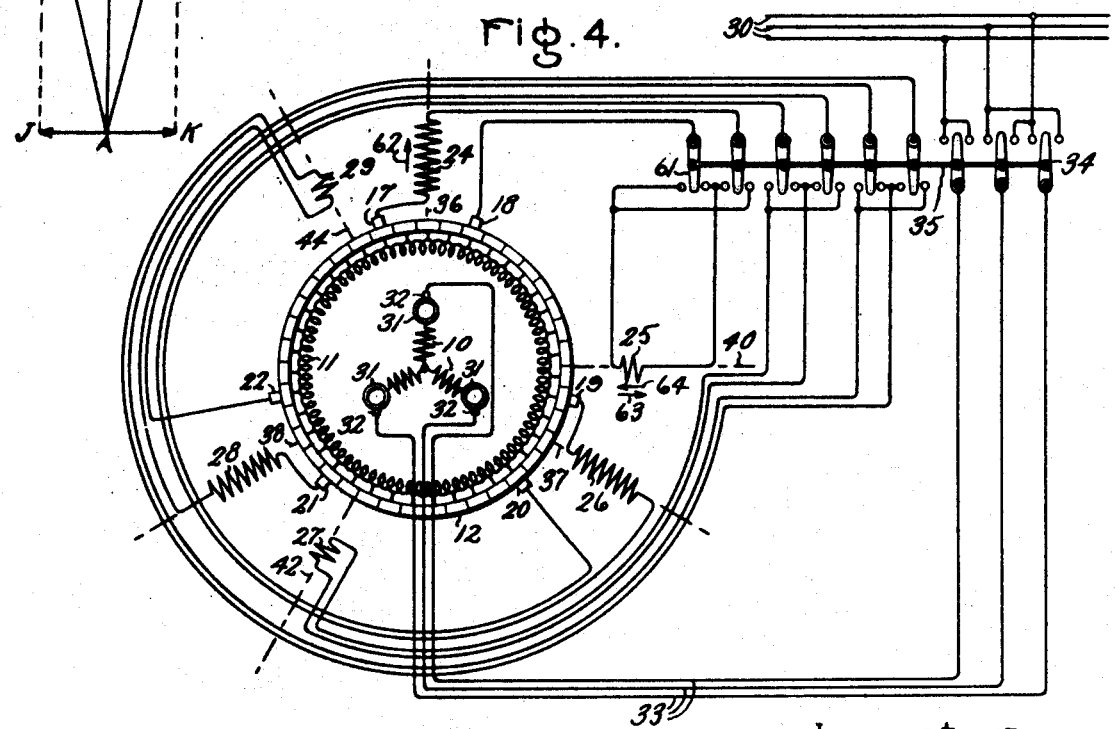

Patented Sept. 27, 1932

1,879,229

UNITED STATES PATENT OFFICE

ARTHUR F. HEINRICH, OF RUGBY, ENGLAND, ASSIGNOR TO GENERAL ELECTRIC COMPANY, A CORPORATION OF NEW YORK

POWER FACTOR REGULATION OF ALTERNATING CURRENT MACHINES

Application filed December 28, 1931, Serial No. 583,578, and in Great Britain January 9, 1931.

My invention relates to the power factor regulation of alternating current machines, and more especially to the power factor regulation of adjustable speed motors of the type described in United States Reissue Patent No. 14,031, Schrage, December 14, 1915. The principal object of my invention is to provide a simple and inexpensive form of Schrage motor that will operate above its inherent power factor in either direction of rotation without shifting its commutator brushes.

The speed, power factor, or both, of the Schrage motor may be regulated by suitably adjusting the commutator brushes connected to the ends of each secondary phase winding. In the majority of the commercial applications of these motors it is frequently desired to change the motor speed and to operate the motor above its inherent power factor with either direction of rotation. In such cases it is desirable to employ manually operated means, such as a system of levers and rods, or power operated means, such as a small electric motor, for suitably shifting the commutator brushes to obtain the desired motor speed and power factor. Obviously, either the manually operated means or the power operated means complicate and increase the ultimate cost of the Schrage motor. However, there are many commercial applications where a Schrage motor is employed because it is occasionally desired to change the motor speed, but the motor operates for comparatively long periods at substantially the same speed with frequent reversals of its direction of rotation, and it is desired that the motor operate above its inherent power factor with either direction of rotation. In such cases, if the usual form of Schrage motor is employed, when the commutator brushes connected to the ends of each secondary phase winding are suitably adjusted to give the desired motor speed with a motor power factor above its inherent value for one direction of rotation, then, when the motor rotation is reversed the brushes must be moved to different positions if the motor is to operate at the same power factor, the spacing between the brushes being kept the same in order to get the same speed. Since the occasional change of motor speed can be readily and economically accomplished by manually shifting the yokes supporting the commutator brushes, and since the spacing between the commutator brushes remains the same for both directions of motor rotation, it is obvious that the employment of complicated and expensive manually operated means, or power operated means, is not economically justified for the sole purpose of obtaining a motor power factor above its inherent value with both directions of rotation. On the other hand, if the commutator brushes are not moved as above described every time the motor rotation is reversed, the motor power factor will be above its inherent value for one direction of rotation, and below its inherent value for the opposite direction of rotation. Obviously, it is highly desirable to avoid such a motor operation. It therefore became desirable to provide a simple and inexpensive form of Schrage motor that will operate above its inherent power factor in either direction of rotation without shifting its commutator brushes.

My invention provides the desired form of Schrage motor. Briefly described, my invention consists of a motor in which each secondary phase winding is divided into at least two portions having different magnetic axes, each secondary phase winding being connected to the corresponding pair of commutator brushes through a switch having two operating positions, the spacing between the two commutator brushes being adjusted to a predetermined amount according to the desired motor speed and power factor. The arrangement of the connections, and the relative number of turns and directions of current flow in the different portions of each secondary phase winding are so selected that the effective magnetic axis of each secondary phase winding is displaced a substantially equal angular amount to one side and then to the other side of that part of the armature winding included between the corresponding pair of commutator brushes with movement of the switch from one to the other operating position. The relation between the direction of motor rotation and the direction of annular displacement just described is such that the motor operates above its inherent power factor with either direction of rotation.

My invention, however, will be best understood from the following description when considered in connection with the accompanying drawings, while those features of my invention which are believed to be novel and patentable are pointed out in the appended claims.

Figure 2:
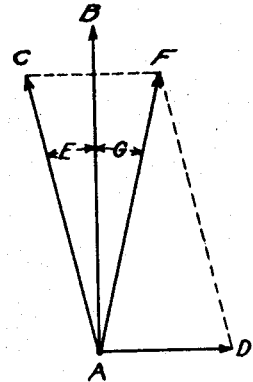

Fig. 1 of the drawings represents a preferred embodiment of my invention applied to a three-phase motor in which each secondary phase winding consists of two portions having different magnetic axes, one winding portion being used for one direction of rotation and both winding portions being used for the other direction of rotation. Fig. 2 represents a vector diagram for explaining my invention as applied to the motor shown in Fig. 1. Fig. 3 represents a modification in which each secondary phase winding consists of three portions having different magnetic axes, different combinations of two winding portions being employed with opposite directions of motor rotation. Fig. 4 represents a modification in which each secondary phase winding consists of two portions, both winding portions being used with either direction of motor rotation. Fig. 5 represents a vector diagram for explaining my invention as applied to the motors shown in Figs. 3 and 4. Similar reference characters represent similar parts in the several figures of the drawings.

Referring to Fig. 1, the motor has a rotatable member carrying a primary winding 10 and a commutated armature winding 11 connected to a commutator 12, the two windings being inductively related to each other. Two movable yokes 15 and 16 carry brushes 17 to 22, inclusive, as shown. The motor has a stationary three-phase secondary winding. Each secondary phase winding consists of two portions having different magnetic axes, and these winding portions may be connected, in a manner later described, to a corresponding pair of commutator brushes through a three pole switch 23 having two operating positions, one brush of each pair being carried by each yoke. Thus, one secondary phase winding consists of portions 24 and 25 which may be connected to brushes 17 and 18. Another secondary phase winding consists of portions 26 and 27 which may be connected to brushes 19 and 20, and the third secondary phase winding consists of portions 28 and 29 which may be connected to brushes 21 and 22. The primary winding 10 may be connected to a three-phase alternating current source 30, through collector rings 31, brushes 32, leads 33, and a three pole switch 34 having two operating positions. The phase sequence connections to primary winding 10 may be reversed by moving switch 34 from one to the other operating position. A common operating rod 35 connected to switches 23 and 34 enables them to be moved simultaneously from one to the other of their operating positions. By tracing out the connections between the commutator brushes, secondary winding, and switch 23, it can be seen that when switch 23 is moved to the right-hand operating position the two portions of each secondary phase winding are connected in series to the corresponding pair of commutator brushes, and when switch 23 is moved to the left-hand operating position one portion of each secondary phase winding is open circuited and the other portion is connected to the corresponding pair of commutator brushes. Thus, with switch 23 in the right-hand operating position, portions 24 and 25 are connected in series to brushes 17 and 18, portions 26 and 27 are connected in series to brushes 19 and 20, and portions 28 and 29 are connected in series to brushes 21 and 22. With switch 23 in the left-hand operating position, corresponding portions 25, 27 and 29 are open circuited, and corresponding portions 24, 26 and 28 are respectively connected to brushes 17 and 18, brushes 19 and 20, and brushes 21 and 22. In order to simplify the drawings and the description thereof, I have shown in Fig. 1 (and also in Figs. 3 and 4) separate rotatable primary and commutated armature windings, and stationary concentrated secondary windings. However, from the description hereinafter given of my invention, it will be obvious to those skilled in the art that my invention is not limited to the particular form of motor structure illustrated.

The following description of the operation of the motor shown in Fig. 1 is given with reference to the vector diagram shown in Fig. 2. Brushes 17 and 18, 19 and 20, and 21 and 22 are separated substantially equal angular amounts, the amount of separation depending upon the desired motor speed and power factor. The magnetic axes of those parts of the armature winding respectively included between brushes 17 and 18, 19 and 20, and 21 and 22, are represented by lines 36, 37 and 38, respectively. The magnetic axes of the secondary phrase winding portions 24 to 29, inclusive, are respectively represented by lines 39 to 44, inclusive. The communtator brushes are preferably so positioned that the magnetic axes 39, 41 and 43 of winding portions 24, 26 and 28, respectively, are displaced substantially equal angular amounts to one side of magnetic axes 36, 37 and 38, respectively. The winding portions 25, 27 and 29 are so positioned that their respective magnetic axes 40, 42 and 44 are displaced substantially equal angular amounts to the other side of magnetic axes 36, 37 and 38, respectively. Because of the symmetrical relationship between the corresponding secondary phase winding portions and their corresponding commutator brushes, the remainder of the description of the motor shown in Fig. 1 is confined to one secondary phase winding and its pair of commutator brushes. In Fig. 2, AB corresponds to the magnetic axis represented by line 36 in Fig. 1. The relation between the number of turns and directions of current flow in winding portions 24 and 25 is such that the directions and relative magnitudes of their magnetomotive forces may be represented in Fig. 2 by AC and AD, respectively. With switches 23 and 34 in their left-hand operating positions, the motor runs in a desired direction, and the effective magnetic axis of the secondary phase winding being considered is represented by AC because only winding portion 24 is connected to brushes 17 and 18. The displacement of AC from AB is in the correct direction to cause the motor to operate above its inherent power factor. With switches 23 and 34 in their right-hand operating positions, the direction of rotation of the motor is reversed, winding portions 24 and 25 are connected to brushes 17 and 18, and the effective magnetic axis of the secondary phase winding is represented by AF, which is the resultant of AC and AD. Since AF is displaced to the opposite side of AB as compared to that of AC, the motor operates above its inherent power factor with the reversed direction of rotation. As shown in Fig. 2, AC and AF are preferably displaced by substantially equal angles E and G from AB, hence the motor operates at substantially the same speed and power factor in both directions of rotation. The commutator brushes may, therefore, be left in their adjusted positions until it is desired to change the speed, power factor, or both, of the motor.

In Figs. 3 and 4, the commutator brushes are arranged in the manner shown in Fig. 1, and, therefore, I have omitted the yokes in order to simplify the drawings. In Fig. 3, each secondary phase winding consists of three portions having different magnetic axes, and these winding portions may be connected, in a manner described later, to a corresponding pair of commutator brushes through switch 23. Thus, one secondary phase winding consists of portions 45, 46 and 47, which may be connected to brushes 17 and 18, another secondary phase winding consists of portions 48, 49 and 50, which may be connected to brushes 19 and 20, and the third secondary phase winding consists of portions 51, 52 and 53, which may be connected to brushes 21 and 22. With switch 23 in the right-hand operating position, portions 46 and 45 are connected in series to brushes 17 and 18, portions 49 and 48 are connected in series to brushes 19 and 20, portions 52 and 51 are connected in series to brushes 21 and 22, and portions 47, 50 and 53 are open circuited. With switch 23 in the left-hand operating position, portions 46 and 47 are connected in series to brushes 17 and 18, portions 49 and 50 are connected in series to brushes 19 and 20, portions 52 and 53 are connected in series to brushes 21 and 22, and portions 45, 48 and 51 are open circuited.

The following description of the operation of the motor shown in Fig. 3 is given with reference to the vector diagram shown in Fig. 5. The commutator brushes are preferably so positioned that the magnetic axes 36, 37 and 38 are substantially in line with the magnetic axes of winding portions 46, 49 and 52, respectively. Corresponding winding portions 45, 48 and 51 are positioned so that their respective magnetic axes 55, 57 and 59 are displaced substantially equal angular amounts to one side of magnetic axes 36, 37 and 38, respectively, and corresponding winding portions 47, 50 and 53 are positioned so that their respective magnetic axes 58, 60 and 56 are displaced substantially equal angular amounts to the other side of magnetic axes 36, 37 and 38, respectively, the opposite displacement angles being preferably made equal. Because of the symmetrical relationship between the corresponding secondary phase winding portions and their corresponding commutator brushes, the remainder of the description of the motor shown in Fig. 3 is confined to one secondary phase winding and its pair of commutator brushes. The connections are so selected that at a given instant the directions of the magnetomotive forces of winding portions 45 and 46 will be represented by their adjacent arrows 54 and 54' if they are connected to the commutator brushes, and the directions of the magnetomotive forces of winding portions 46 and 47 will be represented by their adjacent arrows 54' and 54" if they are connected to the commutator brushes. This relationship and the relative number of turns in winding portions 45, 46 and 47 are such that the directions and relative magnitudes of their magnetomotive forces may be represented by AJ, AH and AK, respectively, in Fig. 5. In Fig. 5, AB corresponds to the magnetic axis represented by line 36 in Figs. 3 and 4. With switches 23 and 34 in their right-hand operating positions, the motor runs in a desired direction, winding portions 45 and 46 are connected to brushes 17 and 18, and the effective magnetic axis of the secondary phase winding being considered is represented by AL, which is the resultant of AH and AJ. The displacement of AL from AB is in the correct direction to cause the motor to operate above its inherent power factor. With switches 23 and 34 in their left-hand operating positions, the direction of rotation of the motor is reversed, winding portions 46 and 47 are connected to brushes 17 and 18, and the effective magnetic axis of the secondary phase winding is represented by AM, which is the resultant of AH and AK. Since AM is displaced to the opposite side of AB as compared to that of AL, the motor operates above its inherent power factor with the reversed direction of rotation. As shown in Fig. 5, AL and AM are preferably displaced by substantially equal angles E and G, respectively, from AB; hence the motor operates at substantially the same speed and power factor in both directions of rotation.

In Fig. 4, each secondary phase winding consists of two portions, both portions being connected in series to the corresponding pair of commutator brushes with either direction of rotation, the connections being made through a six-pole switch 61 having two operating positions. The commutator brushes are preferably so positioned that the magnetic axes 36, 37 and 38 are substantially in line with the magnetic axes of winding portions 24, 26 and 28, respectively. Corresponding winding portions 25, 27 and 29 are preferably positioned so that their respective magnetic axes 40, 42 and 44 are displaced substantially ninety electrical degrees in the same direction from magnetic axes 36, 37 and 38, respectively. The connections between the commutator brushes, switch 61, and the secondary winding portions are so arranged that with movement of the switch 61 from one to the other operating position the connections are reversed to one winding portion of each secondary phase. The object of this reversal in connections is to change the relative directions of the magnetomotive forces in the two winding portions of each secondary phase. Thus, at a given instant, if switch 61 is in the right-hand operating position the magnetomotive forces of winding portions 24 and 25 may be represented by their adjacent arrows 62 and 63, respectively, whereas if switch 61 is in the left-hand operating position the magnetomotive forces of winding portions 24 and 25 may be represented by their adjacent arrows 62 and 64, respectively. The same is true of the other secondary phase windings. Because of the symmetrical relationship between the corresponding secondary phase winding portions and their corresponding commutator brushes, the remainder of the description of the motor shown in Fig. 4 is confined to one secondary phase winding and its pair of commutator brushes. The relative number of turns in winding portions 24 and 25 are such that the magnetomotive force of winding portion 24 may be represented by AH in Fig. 5, and the magnetomotive force of winding portion 25 may be represented at AK when switch 61 is in the right-hand operating position, and by AJ when switch 61 is in the left-hand operating position. From the description given in connection with Figs. 3 and 5, it should be obvious that if switches 34 and 61 in Fig. 4 are moved from one to the other of their operating positions, the direction of rotation of the motor will be reversed, the motor will operate at substantially the same speed and power factor in both directions, and the motor power factor will be above its inherent value with both directions of rotation.

In order to simplify the description of my invention, I have described the winding portions of each secondary phase winding as having such relative strengths and such relative positions that each secondary phase winding has the same magnetomotive force and the same angular displacement from its corresponding armature winding magnetic axis with both directions of motor rotation. However, it will be obvious to those skilled in the art, that the relative strengths and relative positions of the winding portions may be varied to suit different motor operating conditions. Accordingly, while I have, in accordance with the provisions of the patent statutes, described the principles of operation of my invention, together with the apparatus which I now consider to represent the best embodiment thereof, yet I desire to have it understood that the apparatus shown and described is only illustrative of my invention, and that the same may be carried out by other means.

What I claim as new and desire to secure by Letters Patent of the United States, is,—

1. In a dynamo electric machine, the combination of a rotatable armature winding, a pair of circumferentially spaced apart commutator brushes, a stationary winding, switching means having two operating positions, and connecting means between said commutator brushes, stationary winding, and switching means, said connecting means being so arranged that the effective magnetic axis of the stationary winding is displaced to one side and then to the other side of the magnetic axis of that part of the armature winding included between the commutator brushes with movement of the switching means from one to the other operating position.

2. An alternating current motor comprising relatively rotatable primary and secondary windings, a commutated armature winding inductively related to said primary winding, a pair of circumferentially spaced apart commutator brushes, switching means having two operating positions, and connecting means between said secondary winding, commutator brushes, and switching means, said connecting means being so arranged that the effective magnetic axis of the secondary winding is displaced to one side and then to the other side of the magnetic axis of that part of the armature winding included between the commutator brushes with movement of the switching means from one to the other operating position.

3. An alternating current motor comprising relatively rotatable primary and secondary windings, a commutated armature winding inductively related to said primary winding, a pair of circumferentially spaced apart commutator brushes, and switching means for selectively connecting said commutator brushes to said secondary winding so that the effective magnetic axis of the latter is displaced a substantially equal angular amount to one side or the other side of the magnetic axis of that part of the armature winding included between said commutator brushes.

4. An alternating current motor comprising a rotatable primary winding, a rotatable commutated armature winding inductively related to said primary winding, a plurality of pairs of circumferentially spaced apart commutator brushes, a stationary polyphase secondary winding having a phase winding for each pair of brushes, and switching means having two operating positions, one of said operating positions for connecting each pair of commutator brushes to its secondary phase winding so that the effective magnetic axes of all the secondary phase windings are displaced substantially equal angular amounts to the same side of the magnetic axes of those parts of the armature winding included between their corresponding pair of commutator brushes, and the other of said operating positions for connecting each pair of commutator brushes to its secondary phase winding so that the effective magnetic axes of all the secondary phase windings are displaced substantially equal angular amounts to the other side of the magnetic axes of those parts of the armature winding included between their corresponding pair of commutator brushes.

5. An alternating current dynamo electric machine comprising relatively rotatable primary and secondary windings, said secondary winding consisting of two portions having different magnetic axes, a commutated armature winding inductively related to said primary winding, a pair of circumferentially spaced apart commutator brushes, and switching means having two operating positions, one of said operating positions for connecting both of said winding portions in series with each other to said commutator brushes, and the other of said operating positions for open circuiting one of said winding portions and connecting the other of said winding portions to said commutator brushes.

6. An alternating current motor comprising a rotatable primary winding, a rotatable commutated armature winding inductively related to said primary winding, a plurality of pairs of circumferentially spaced apart commutator brushes, a stationary polyphase secondary winding having a phase winding for each pair of commutator brushes, each secondary phase winding consisting of two portions whose respective magnetic axes are on opposite sides of the magnetic axis of that part of the armature winding included between the corresponding pair of commutator brushes, and switching means having two operating positions, one of said operating positions for connecting both portions of each secondary phase winding in series with each other to the corresponding pair of commutator brushes, and the other of said operating positions for open circuiting one portion of each secondary phase winding and connecting the other portion of each secondary phase winding to the corresponding pair of commutator brushes.

7. An alternating current motor comprising a rotatable primary winding, a rotatable commutated armature winding inductively related to said primary winding, a plurality of pairs of circumferentially spaced apart commutator brushes, a stationary polyphase secondary winding having a phase winding for each pair of commutator brushes, each secondary phase winding consisting of two portions whose respective magnetic axes are on opposite sides of the magnetic axis of that part of the armature winding included between the corresponding pair of commutator brushes, the magnetic axes of the corresponding portions of all the secondary winding phases being displaced substantially equal angular amounts in the same direction from the magnetic axes of those parts of the armature winding included between their corresponding pairs of commutator brushes, and switching means having two operating positions, one of said operating positions for connecting both portions of each secondary phase winding in series with each other to the corresponding pair of commutator brushes, and the other of said operating positions for open circuiting one portion of each secondary phase winding and connecting the other portion of each secondary phase winding to the corresponding pair of commutator brushes with corresponding portions of the secondary phase windings connected to the several pairs of commutator brushes, the relation between the number of turns and directions of current flow in the two portions of each secondary phase winding being such that the effective magnetic axis of each secondary phase winding is displaced a substantially equal angular amount to one side and then to the other side of the magnetic axis of that part of the armature winding included between the corresponding pair of commutator brushes with movement of the switching means from one to the other operating position.

8. An alternating current dynamo electric machine comprising relatively rotatable primary and secondary windings, said secondary winding consisting of three portions having different magnetic axes, a commutated armature winding inductively related to said primary winding, a pair of circumferentially spaced apart commutator brushes, and switching means having two operating positions, one of said operating positions for open circuiting one of said winding portions and connecting the other two winding portions in series with each other to said commutator brushes, and the other of said operating positions for open circuiting one of said other two winding portions and connecting the remaining two winding portions in series with each other to said source.

9. An alternating current motor comprising a rotatable primary winding, a rotatable commutated armature winding inductively related to said primary winding, a plurality of pairs of circumferentially spaced apart commutator brushes, a stationary polyphase secondary winding having a separate phase winding for each pair of commutator brushes, each secondary phase winding consisting of three portions, one of said winding portions having its magnetic axis substantially midway between the magnetic axes of the second and third winding portions, and switching means having two operating positions, one of said operating positions for connecting the first and second mentioned portions of each secondary phase winding in series with each other to the corresponding pair of commutator brushes, and the other of said operating positions for connecting the first and third mentioned portions of each secondary phase winding in series with each other to the corresponding pair of commutator brushes.

10. An alternating current motor comprising a rotatable primary winding, a rotatable commutated armature winding inductively related to said primary winding, a plurality of pairs of circumferentially spaced apart commutator brushes, a stationary polyphase secondary winding having a separate phase winding for each pair of commutator brushes, each secondary phase winding consisting of three portions, one of said winding portions having its magnetic axis substantially in line with the magnetic axis of that part of the armature winding included between the corresponding pair of commutator brushes and the respective magnetic axes of the second and third winding portions being displaced substantially equal angular amounts to opposite sides of the magnetic axis of the first mentioned winding portion, and switching means having two operating positions, one of said operating positions for connecting the first and second mentioned portions of each secondary winding phase in series with each other to the corresponding pair of commutator brushes, and the other of said operating positions for connecting the first and third mentioned portions of each secondary winding phase in series with each other to the corresponding pair of commutator brushes, the relation between the number of turns and directions of current flow in the three portions of each secondary phase winding being such that the effective magnetic axis of each secondary phase winding is displaced a substantially equal angular amount to one side and then to the other side of the magnetic axis of that part of the armature winding included between the corresponding pair of commutator brushes with movement of the switching means from one to the other operating position.

11. An alternating current dynamo electric machine comprising relatively rotatable primary and secondary windings, said secondary winding consisting of two portions having different magnetic axes, a commutated armature winding inductively related to said primary winding, a pair of circumferentially spaced apart commutator brushes, and switching means having two operating positions, one of said operating positions for connecting both of said winding portions in series with each other to said commutator brushes, and the other of said operating positions for connecting both of said winding portions in series with each other to said commutator brushes with the connections to one of said winding portions reversed from those in the first mentioned operating position of the switching means.

12. An alternating current motor comprising a rotatable primary winding, a rotatable commutated armature winding inductively related to said primary winding, a plurality of pairs of circumferentially spaced apart commutator brushes, a stationary polyphase secondary winding having a separate phase winding for each pair of commutator brushes, each secondary phase winding consisting of two portions whose magnetic axes are substantially ninety electrical degrees apart, and switching means having two operating positions, one of said operating positions for connecting both portions of each secondary phase winding in series with each other to the corresponding pair of commutator brushes, and the other of said operating positions for connecting both portions of each secondary phase winding in series with each other to the corresponding pair of commutator brushes with the connections to one of the portions reversed from those in the first mentioned operating position of the switching means, the connections being reversed to corresponding portions of the secondary phase windings.

13. An alternating current motor comprising a rotatable primary winding, a rotatable commutated armature winding inductively related to said primary winding, a plurality of pairs of circumferentially spaced apart commutator brushes, a stationary polyphase winding having a separate phase winding for each pair of commutator brushes, each secondary phase winding consisting of two portions, one of said portions having its magnetic axis substantially in line with the magnetic axis of that part of the armature winding included between the corresponding pair of commutator brushes, and the second of said portions having its magnetic axis displaced substantially ninety electrical degrees from the magnetic axis of the first mentioned portion, and switching means having two operating positions, one of said operating positions for connecting both portions of each secondary phase winding in series with each other to the corresponding pair of commutator brushes, and the other of said operating positions for connecting both portions of each secondary phase winding in series with each other to the corresponding pair of commutator brushes with the connections to the second portion reversed from those in the first mentioned operating position of the switching means.

14. The combination with a source of polyphase alternating current, of an alternating current motor comprising a rotatable primary winding, a rotatable commutated armature winding inductively related to said primary winding, a plurality of pairs of circumferentially spaced apart commutator brushes, a stationary polyphase secondary winding having a separate phase winding for each pair of commutator brushes, each secondary phase winding consisting of at least two portions having different magnetic axes, switching means between said primary winding and said source, said switching means having two operating positions for reversing the phase sequence connections to the primary winding with movement of the switching means from one to the other operating position, additional switching means having two operating positions for selectively connecting said commutator brushes to said secondary winding so that the effective magnetic axis of each secondary phase winding is displaced a substantially equal angular amount to one side and then to the other side of the magnetic axis of that part of the armature winding included between the corresponding pair of commutator brushes with movement of the last mentioned switching means from one to the other operating position, and means for simultaneously moving both of said switching means from one to the other of their operating positions.

In witness whereof, I have hereunto set my hand.

ARTHUR F. HEINRICH.